United States Patent [19]

Voges

[11] 4,171,733
[45] Oct. 23, 1979

[54] SPEED-RESPONSIVE VALVE CONTROL FOR INTAKE MANIFOLD TO CRANKCASE IN INTERNAL COMBUSTION ENGINE

[75] Inventor: Fred W. Voges, Manhasset, N.Y.

[73] Assignee: The Voges Manufacturing Company, Inc., Ozone Park, N.Y.

[21] Appl. No.: 794,071

[22] Filed: May 5, 1977

[51] Int. Cl.² .................... B60K 13/02; F01M 7/02
[52] U.S. Cl. .................... 180/178; 123/119 B
[58] Field of Search .............. 123/119 B, 103 R; 180/105 E, 108, 110

[56] References Cited

U.S. PATENT DOCUMENTS

| | | | |
|---|---|---|---|
| 3,294,115 | 12/1966 | Koenigsberg et al. | 123/119 B |
| 3,455,285 | 7/1969 | Sheppard | 123/119 B |
| 3,587,544 | 6/1971 | Miles | 123/119 B |
| 3,596,731 | 8/1971 | Fales | 123/103 R |
| 3,673,994 | 7/1972 | Aono | 123/119 B |
| 3,677,240 | 7/1972 | Sarto | 123/119 B |
| 3,754,538 | 8/1973 | Ephraim et al. | 123/119 B |
| 3,839,996 | 10/1974 | DeBiasse | 123/119 B |
| 3,923,024 | 12/1975 | Dabrio | 123/119 B |
| 3,924,588 | 12/1975 | Hager | 123/119 B |

*Primary Examiner*—Joseph F. Peters, Jr.
*Assistant Examiner*—Donn McGiehan
*Attorney, Agent, or Firm*—Allison C. Collard; Thomas M. Galgano

[57] ABSTRACT

A pressure balancing system for an internal combustion engine wherein a conduit means connects the intake manifold to the crankcase for balancing the pressures therein. A valve is located in the conduit means and is responsive to the speed of the vehicle. A vehicle speed responsive device controls the opening and closing of the valve. The valve is normally closed at low or no speed and is opened at a predetermined speed, such as about 20 to 25 miles per hour, to connect the intake manifold to the crankcase so as to substantially balance the pressures therein at higher speeds. An oil separator may be inserted in the conduit means.

3 Claims, 2 Drawing Figures

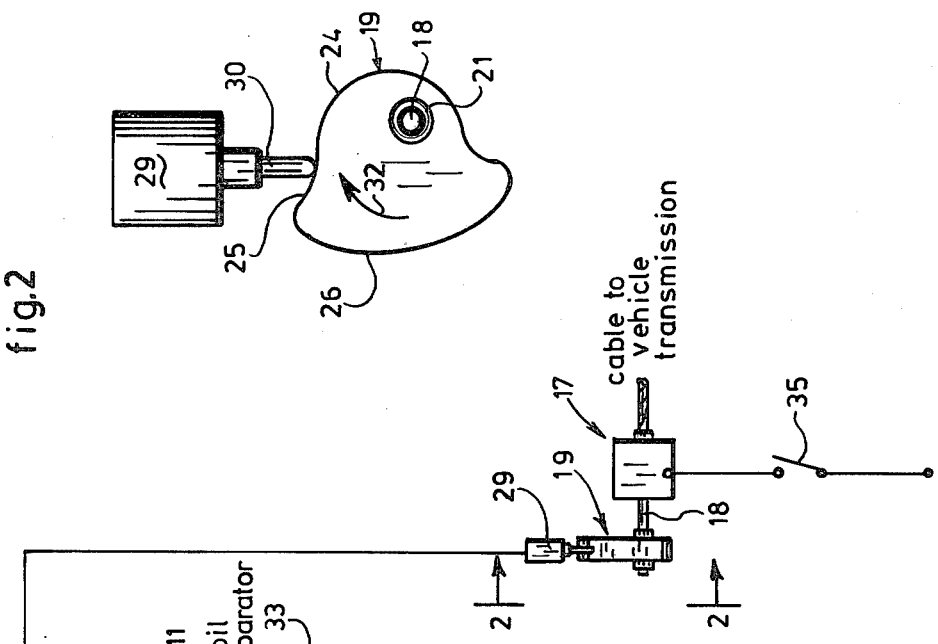
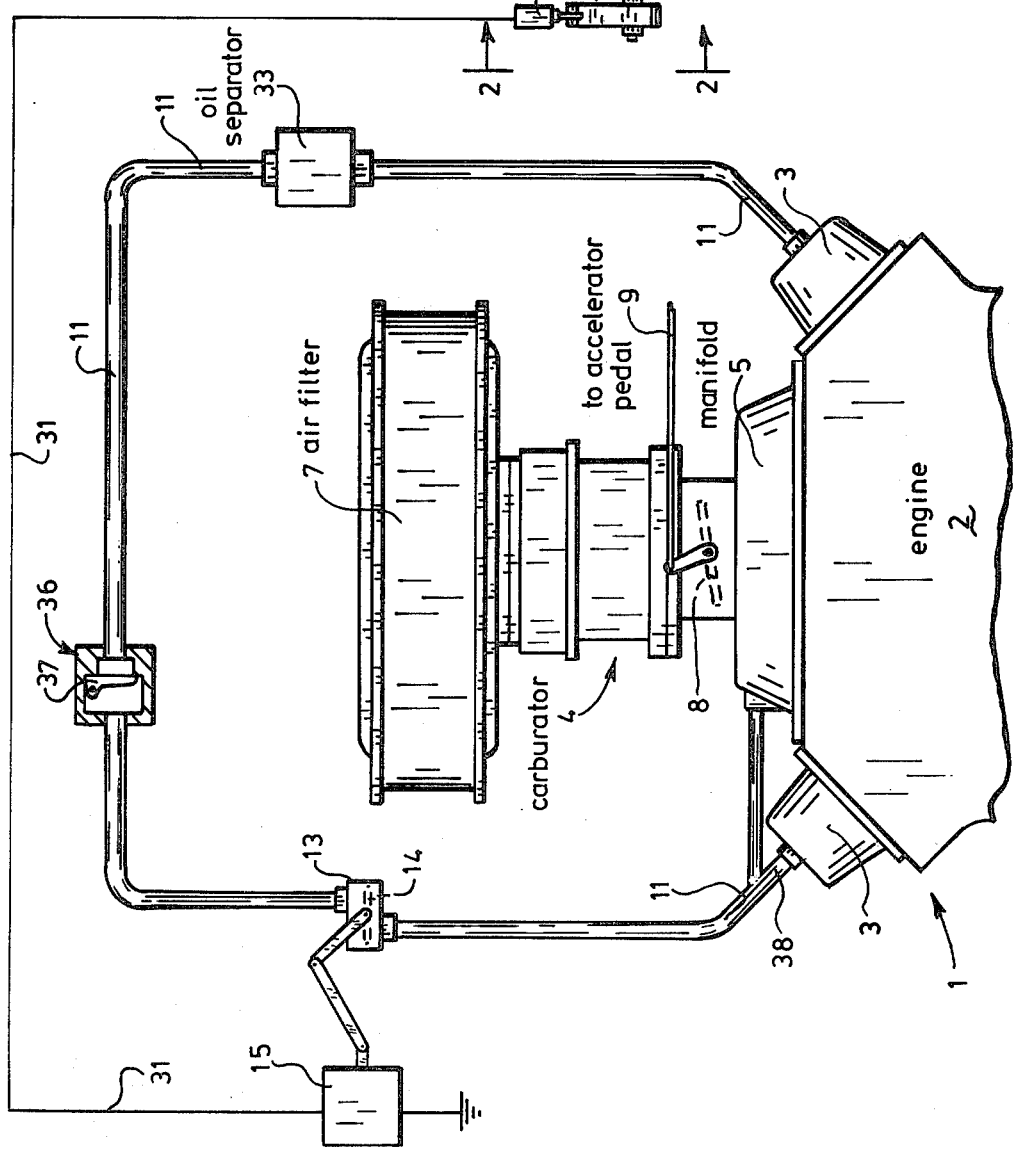

SPEED-RESPONSIVE VALVE CONTROL FOR INTAKE MANIFOLD TO CRANKCASE IN INTERNAL COMBUSTION ENGINE

CROSS REFERENCE TO RELATED APPLICATIONS

The related application is that of Fred W. Voges entitled "Speed Responsive Device for Internal Combustion Engine with Pivoted Plate Clapper Type Check Valve Between Crank Case and Intake Manifold, application Ser. No. 785,590, filed Apr. 7, 1977."

BACKGROUND OF THE INVENTION

1. Field of the Invention

The invention relates generally to the improvement in internal combustion engines to decrease and thereby improve both engine wear and pollution and increase fuel and oil economy. More particularly, the invention lies in the field of internal combustion engines which correlate crankcase ventilation devices with controls for vapor from crankcase used with charge to the carburetor.

2. Description of the Prior Art

Heretofore, P.C.V. valves have been used in order to assist crankcase ventilation.

U.S. Pat. No. 3,839,996 discloses the overall combination of an internal combustion engine operating under increased efficiency and power output having a crankcase, intake valve cover closed and sealed to hold a vacuum, wherein the one-way valve 62 allows communication from the valve cover 53 to the intake system 28 but precludes communication from the intake system to the valve cover. Note that the intake vacuum closely corresponds to the vacuum developed in each combustion chamber on the intake stroke of the piston. The system also provides for a pressure gage which can be connected to the oil filler port, to ascertain whether the crankcase is operating at a vacuum.

U.S. Pat. Nos. 3,455,285, 3,587,544, 3,677,240 and 3,923,024 are cited as of interest in disclosing an internal combustion engine having a crankcase breather system illustrating various additional features such as a V-block engine and various types of P.C.V. valves arranged downstream of the throttle valve.

All of the prior art mentioned hereinabove does not correlate the throttle controlling the vehicle speed to the vacuum which exists within the crank case 50 and it is the object of the present invention to provide a governor controlled circuit which provides equalization of the intake manifold pressure in the crank case at a desirable and practical vehicle operating speed whether accelerating, coasting, or decelerating and in this manner to achieve greater engine efficiency without in any way interfering with the fuel mixture ratio. Because of the closed system there is cooler operation of the vehicle, smoother performance in acceleration and deceleration and lower maintenance requirements.

BRIEF DESCRIPTION OF THE DRAWING

In the drawings:

FIG. 1 is a view of the arrangement of the several elements of the invention applied to a conventional internal combustion engine.

FIG. 2 is an elevational view taken on line 2—2 of FIG. 1.

DESCRIPTION OF THE PREFERRED EMBODIMENTS

Referring to FIG. 1, internal combustion engine 1 is provided with usual crankcase portion 2, valve cover means 3, carburetor 4 sitting on and connected to the intake manifold means 5. The carburetor is provided with the usual air filter 7 and has the conventional throttle valve means 8 connected to the accelerator rod 9.

The pressure equalizing conduit means is represented by a pipe 11 connected at one end to valve cover 3 and at the other end to intake manifold 5. The inside of valve cover 3 is connected to the interior of the crankcase by the usual drain passage means, a construction which is well known in the art. The crankcase may be sealed from the atmosphere.

A valve 13 is inserted in pipe 11 to control the communication between crankcase 2 and intake manifold 5. Usually the valve will be in open or closed position. While valve 13 may be of any construction, it is represented by a butterfly type valve having the usual pivoted plate 14 for closing pipe 11 in one position and opening it in another position.

An electric actuator 15 which may be a conventional solenoid or other forms of electro-motor device is connected by suitable rod means to plate 14 to move it to open or closed position.

The actuation of valve 13 is responsive to the speed of the vehicle. A speed responsive device 17 which may be of any type speed responsive governor means, is driven by a conventional speedometer cable connected to the vehicle transmission, or any other power take-off capable of registering vehicle speed in miles per hour. Governor 17 may also be the usual cruise control governor means manually adjustable found on many vehicles. Governor 17 is provided with an output member, such as shaft 18. The degree of rotation of shaft 18 in response to the speed of the vehicle is a measure of the speed. A cam 19 is angularly adjustable on shaft 18 by a set screw 21 in the hub of the cam as illustrated in FIG. 2.

As shown in FIG. 2, cam 19 is a lobed disc which has a peripheral portion 24 which rises gradually in a curve 25 to a peripheral lobe or portion 26 which is of constant radius with the center of shaft 18.

Cam 19 operates a switch device 29 through a switch operating rod 30. Switch 29 may be in the form of microswitch. The scale of FIG. 2 is exaggerated to better disclose the mechanical details. Switch 29 is connected to an electric source and to solenoid 15 by wire 31. At start or low vehicle speed rod 30 rests on peripheral portion 24 of cam 19 and in that position switch 29 is open. As vehicle speed picks up, cam 19 will be rotated clockwise, in direction of arrow 32, until cam portion 26 is reached. At that point rod 30 has been moved to the position to close switch 29 and remain closed in view of the constant radius of lobe 26.

The closure of switch 29 actuates solenoid 15 to open valve 13 and serves to interconnect the intake manifold to the valve cover and in this manner the crankcase is open to the manifold so that the pressures in the intake manifold and crankcase are substantially equal. The pressure balancing takes place only above a predetermined vehicle speed which, of course, is substantially proportional to the engine speed for a given transmission gear setting. The advantages of balanced pressures in the intake manifold and crankcase are well known and are desirable. However, at low speed or at no speed an open connection between the manifold and crankcase would interfere with starting, idling and acceleration. By making the opening of pipe 11 responsive to a desired vehicle speed the above undesirable interferences are automatically avoided.

Cam 19 is adjustable to vary the speed at which valve 13 opens. As shown in FIG. 2, by loosening set screw 21 cam 19 may be rotated on shaft 18 anti-clockwise to move the beginning of lobe 26 away from the point where rod or switch member 30 contacts cam 19 on portion 24, and thus raise the speed at which switch 29 is closed.

Moving cam 19 on shaft 18 clockwise would cause switch 29 to close at a lower speed and thus open valve 13 at a lower vehicle speed.

A conventional oil separator 33 may be placed in pipe 11 to separate any entrained oil in the flow in pipe 11 when valve 13 is open, and thus reduce the flow of oil vapors into the intake manifold.

A manual switch 35 may be provided to control governor 17, especially if it is a cruise control device, to render it inoperative if so desired. Switch 35 may also be used to control the current connection (not shown) to switch 29.

In operation, valve 13 is normally closed and switch 29 is normally open. After the engine is started and the vehicle is set in motion governor device 17 becomes operative to move shaft 18 and cam 19 clockwise or however in response to increasing speed. At the predetermined low speed, say, 20 to 25 miles per hour, portion 25 of cam 19 moves rod 30 up, and when lobe 26 contacts rod 30 the rod is in the position to close switch 29 to actuate valve 13 to open position. Constant radius lobe 26 keeps switch 29 closed during speeds above the predetermined low speed. Upon deceleration of the vehicle cam 19 is moved anti-clockwise and when rod 30 moves from lobe 26 to portions 25-24 switch 29 reopens and valve 13 is moved to closed position.

In lieu of the electro-magnetic valve actuating means 15 other forms of actuators may be used, such as pressure fluid motor means controlled by suitable valve means connected to rod 30, or by mechanical means, such as link means or Bowden wire means connected between valve member 14 and actuating rod 30.

For more efficient starting and idling, a conventional clapper check valve 36 with a pivoted clapper 37 therein may be vertically arranged in pipe 11 between the oil separator 33 and valve 13, opening in the direction of the intake manifold. A branch pipe 38 connects pipe 11 to valve cover 3.

Although a particular embodiment of the invention has been shown and described for the purpose of illustration, it will be evident that various changes and modifications may be made therein without departing from the scope and spirit of the invention.

I have discovered that the here shown arrangement of the check valve entirely eliminates the use of the conventional PCV and will facilitate easy starting and acceleration of the engine under higher vacuum in the intake manifold.

I claim:

1. In an internal combustion engine for driving a vehicle:
   said engine having an intake manifold and a crankcase, said crankcase being substantially sealed off from the atmosphere;
   conduit means interconnecting the intake manifold and the crankcase;
   a normally closed valve means in said conduit means for controlling communication between the intake manifold and the crankcase;
   an electro-magnetic actuator coupled to said valve means for moving said valve means to an open or closed position;
   switch means for energizing said actuator to move said valve to a desired position, said switch means including a switch member movable between an activating and deactivating position;
   means responsive to vehicle speed for activating and deactivating said switch means and for controlling communication between said intake manifold and the crankcase, said means responsive to vehicle speed comprising a speed responsive device having a shaft rotatable responsive to vehicle speed and a disc cam adjustably secured to said shaft, said disc cam having a peripheral surface which is disposed for cooperative operative engagement with said switch member, said disc cam having a lobed peripheral surface portion to move said switch member to an activating position so as to, in turn, energize the actuator to close the valve means at a predetermined vehicle speed.

2. The engine of claim 1 wherein an oil separator is inserted in the conduit means.

3. The engine of claim 1 having a conduit means connecting the crank case to the intake manifold, a clapper check valve in said conduit means permitting flow from said crank case to said intake manifold, said check valve comprising a housing, a valve seat in said housing, and a pivoted valve member biased toward the seat to close communication between said crank case and said intake manifold.

* * * * *